(12) United States Patent
Silveria et al.

(10) Patent No.: US 7,075,022 B1
(45) Date of Patent: Jul. 11, 2006

(54) POSITION SENSOR RESPONSIVE TO GEAR SELECTION OF VEHICULAR TRANSMISSION

(75) Inventors: Jeffrey P. Silveria, Norwood, MA (US); Thomas A. Perkins, North Attleboro, MA (US); Dale R. Sogge, Wrentham, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 11/324,813

(22) Filed: Jan. 4, 2006

Related U.S. Application Data

(60) Provisional application No. 60/646,940, filed on Jan. 25, 2005.

(51) Int. Cl.
   *H01H 9/06* (2006.01)
(52) U.S. Cl. .................................... 200/61.88
(58) Field of Classification Search .... 200/11 R–11 H, 200/61.85, 61.88
   See application file for complete search history.

(56) References Cited

U.S. PATENT DOCUMENTS

| | | | |
|---|---|---|---|
| 5,099,092 A | | 3/1992 | Lauritsen |
| 5,338,907 A | * | 8/1994 | Baker et al. ............. 200/61.88 |
| 5,736,701 A | * | 4/1998 | O'Brien et al. .......... 200/61.88 |
| 5,811,747 A | * | 9/1998 | Taniguchi et al. ....... 200/61.88 |
| 5,969,313 A | * | 10/1999 | Ikeshima et al. ........ 200/61.88 |
| 5,977,496 A | * | 11/1999 | Halberg et al. .......... 200/61.88 |
| 6,897,386 B1 | * | 5/2005 | Nakazawa et al. ....... 200/61.88 |
| 6,979,788 B1 | * | 12/2005 | Barbagelata et al. ..... 200/61.88 |

* cited by examiner

*Primary Examiner*—Michael A. Friedhofer
(74) *Attorney, Agent, or Firm*—Russell E. Baumann

(57) ABSTRACT

A switch system (10) for use with vehicular transmissions for providing an indication of transmission operation in which an electrically insulating ramp plate (14) is fixedly mounted on a face surface of an electrically conductive detent plate (12). Detent plate (12) has a shaft receiving bore (12*f*) formed in a hub (12*e*) that extends from a face surface and interfits with hub (16*e*) of the actuator plate. The detent plate is fixedly mounted to a rotatable shaft received in the bore of hub (12*e*) and is rotatably mounted relative to actuator plate (16). Ramp plate (14) has a plurality of openings each defined by a lifting ramp at two opposite ends and conductive leads mounted on the actuator plate, as by insert molding, extend into cut-outs formed in the actuator plate. These cut-outs are alignable with the openings in the ramp plate and the conductive leads have free ends biased toward the detent plate so that rotation of the actuator plate will selectively close or open circuits between the conductive leads and the detent plate. In an additional embodiment, a locking feature is provided for locking the switch system in a selected orientation during shipment to an OEM by using a pin (18) that is only partially inserted through a bore aligned with a reference feature (16*f*) of the actuator plate.

8 Claims, 5 Drawing Sheets

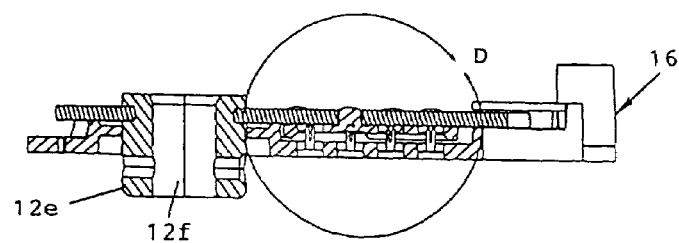
FIG. 3
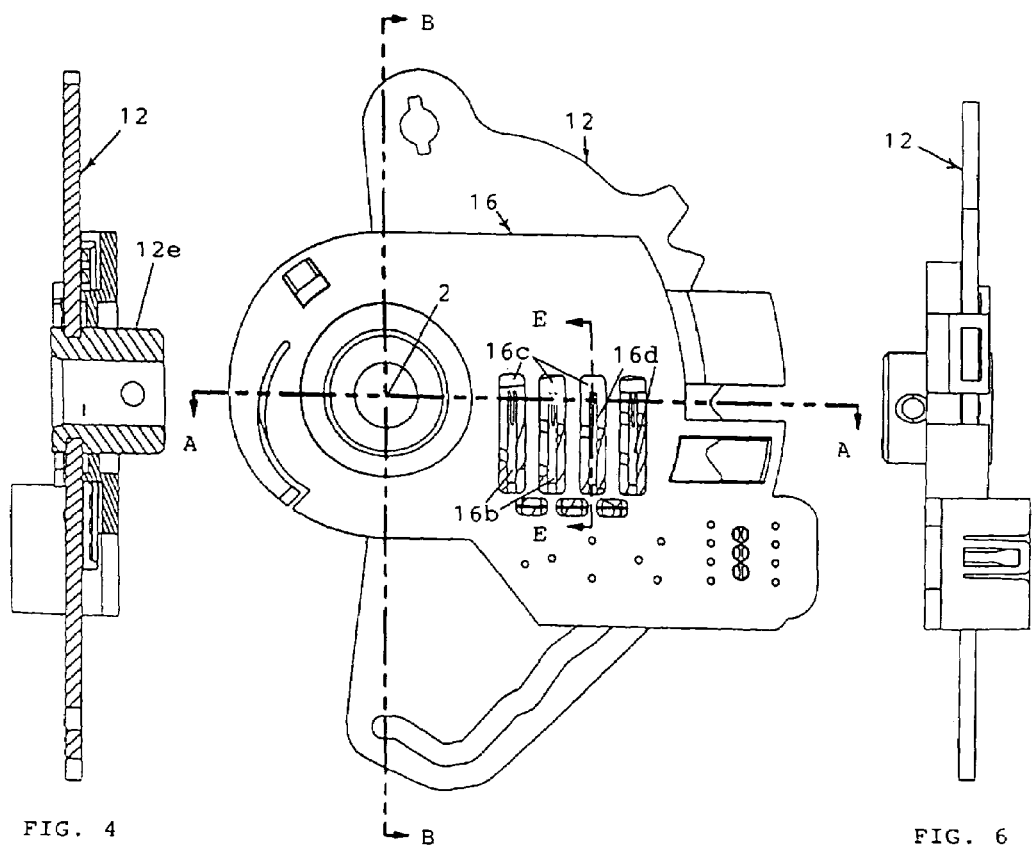
FIG. 4
FIG. 2
FIG. 6

POSITION SENSOR RESPONSIVE TO GEAR SELECTION OF VEHICULAR TRANSMISSION

RELATED APPLICATIONS

Benefit is claimed under 35 U.S.C. Section 119(e) (1) of U.S. Provisional Application No. 60/646,940, filed Jan. 25, 2005.

FIELD OF THE INVENTION

This invention relates generally to vehicular transmissions and more particularly to an electrical switch system for providing a continuous signal to the transmission controller indicative of the position of the transmission.

BACKGROUND OF THE INVENTION

It is known to mount a rotary switch on a transmission housing externally thereof to receive mechanical gear selection inputs from the operator of a vehicle through various linkages and output gear selections to appropriate output means such as a decoder module and the transmission electronic control unit via electronic signals. The switch typically includes a quadrant with a selected number of electrical switch segments disposed thereon with each segment providing an output to the output means. A manual valve controlling hydraulic operation of the transmission is mechanically coupled to a plate having indexing detents, called a detent plate, mounted on a shaft and pivotably movable therewith. The shaft extends through the transmission housing wall and a switch bar is fixedly attached to the shaft externally of the transmission housing so that when a vehicle operator selects a gear the switch bar within the rotary switch moves across the quadrant to a predetermined position to engage one or more of the electrical segments. In certain systems the electronic control monitors the gear position along with other inputs, for example, throttle position, output shaft speed, engine speed, engine load and so on.

In U.S. Pat. No. 5,736,701, assigned to the assignee of the present invention, a switch system is disclosed which is mounted within the transmission housing in order to avoid placing the switches in a hostile environment subject to water splash and the like as well as to avoid tolerance stack-up problems associated with linkages employed when mounting the switches externally of the transmission housing.

In the referenced patent, a movable electrically conductive contact assembly is mounted directly on a first face surface of the detent plate of the manual valve assembly. A generally flat quadrant shaped housing member, formed of electrically insulative material, is rotatably mounted on the manual shaft in a position adjacent to and overlying the detent plate. A stationary, electrically conductive contact assembly is disposed on a face of the housing member overlying the first face surface of the detent plate. The housing member is provided with a pair of prongs which receive therebetween the roller of a roller/spring assembly to thereby maintain the housing member in a selected X-Y position. The stationary contact assembly has a plurality of arc-shaped contact segments separated from one another in a radial direction by rib members which extend from the surface of the housing a selected distance beyond the contact segments to thereby prevent short circuiting between adjacent contact segments by debris or the like.

Switch systems made in accordance with the '701 patent are very effective in obviating the prior art hostile environment and stack-up problems; however, it is desirable to provide a lower cost system which is reliable, easily tuned and one in which changing the switching points is facilitated.

Position sensors used in transmissions often require sensing tolerances as tight as 0.7 mm (equivalent to 1° at a 20 mm radius). By reducing the number of separate components in a device, tolerance "stacks" may be distributed in a fashion that allows for maximum flexibility in part and tooling design. Additionally, the lower part count means the same stack can be divided among fewer parts, leading to larger tolerances for any individual component. Component cost can be reduced due to the looser tolerances allowed, and assembly device costs will be lower due to fewer operations that need not be as exact.

SUMMARY OF THE INVENTION

An object of the invention is the provision of a switch system used with vehicular transmissions for providing an indication of transmission operation which is of low cost, robust, reliable and relatively insensitive to vibration.

Another object of the invention is the provision of an electrical switch position sensor responsive to gear selections of a vehicular transmission that has fewer components than previous systems, is easily tuned and one in which switching point changes is facilitated.

Yet another object of the invention is the provision of a position sensor that overcomes the limitations of the prior art.

Other objects, advantages and details of the position sensor appear in the following detailed description of preferred embodiments of the invention.

Briefly, in accordance with a preferred embodiment of the invention, a set of non-conductive lifting ramps are mounted to a conductive detent plate. A molded actuator to which conductive spring loaded contacts and conductive connector pins are fastened, for example, by being insert molded in the actuator, is then coupled to the detent plate with the spring loaded contacts facing the detent plate and lifting ramps. In a modified embodiment, contact resistance is decreased by incorporating a supplemental conductive plate having improved conductivity characteristics between the detent plate and the lifting ramps, for example, by attaching the supplemental plate with rivets.

In an additional embodiment, a locking feature is provided for locking the detent plate and actuator of the position sensor in a selected orientation during shipment to an OEM by using a pin which is only partially inserted through a bore in the hub of the detent plate with a feature of the actuator used to reference the pin. During assembly, the shaft to which the position sensor is mounted is inserted through the hub and the pin is then driven through the bore in the hub and into a bore in the shaft. When this is done the actuator is free to move relative to the detent plate and the shaft.

BRIEF DESCRIPTION OF THE DRAWINGS

Other objects and features of the invention will become apparent by reference to the following detailed description of preferred embodiments when considered in connection with the accompanying drawings wherein:

FIG. 2 is a bottom plan view of the assembled FIG. 1 switch system, that is, looking from below relative to the FIG. 1 view;

FIG. 3 is an inverted cross section take on line A—A of FIG. 2;

FIG. 4 is a cross section taken on line B—B of FIG. 2;

FIG. 6 is a right side view relative to the FIG. 2 structure as shown;

DETAILED DESCRIPTION OF PREFERRED EMBODIMENTS

Figure 1:
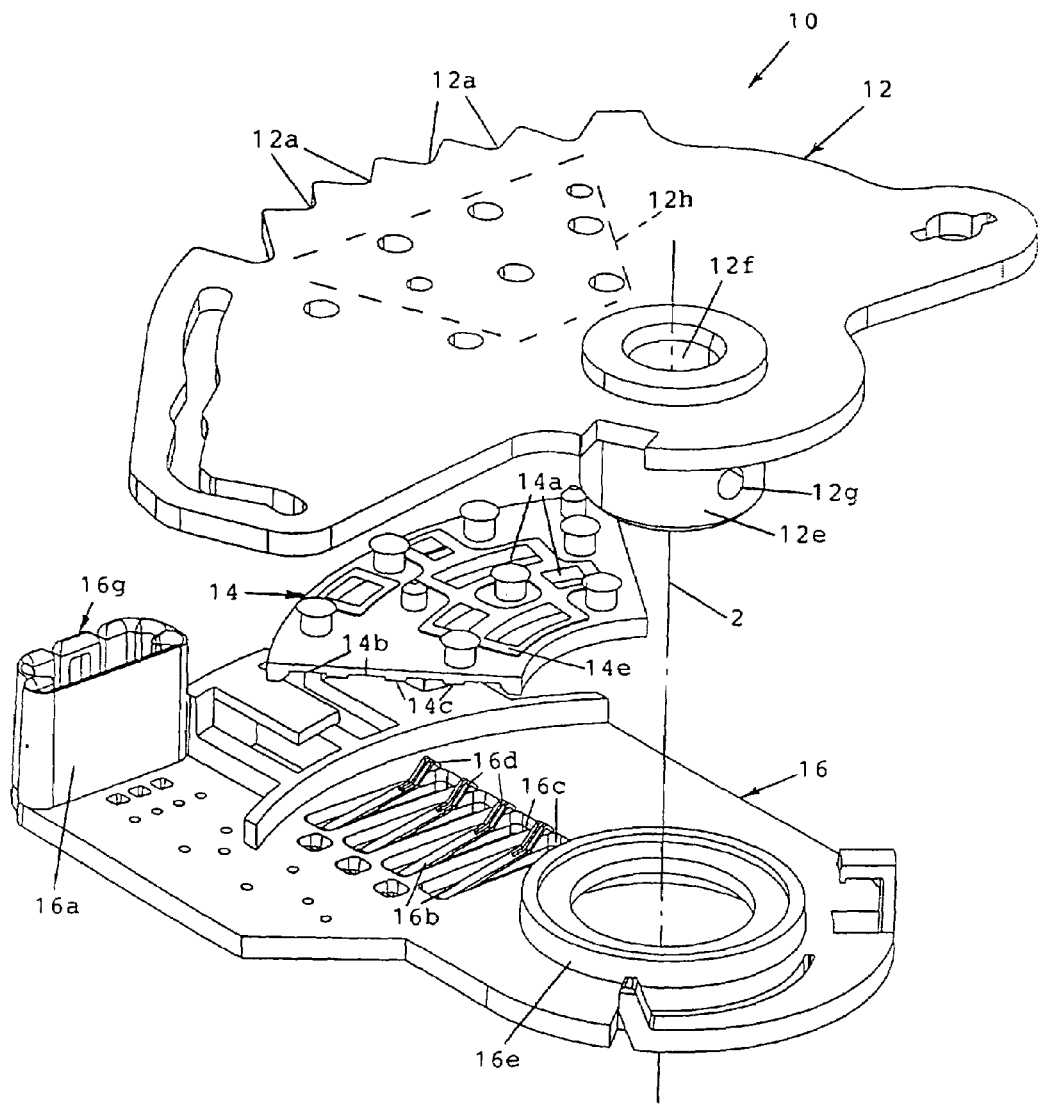
FIG. 1 is an exploded perspective view of a position sensor or switch system made in accordance with a preferred embodiment of the invention.
Figure 7:
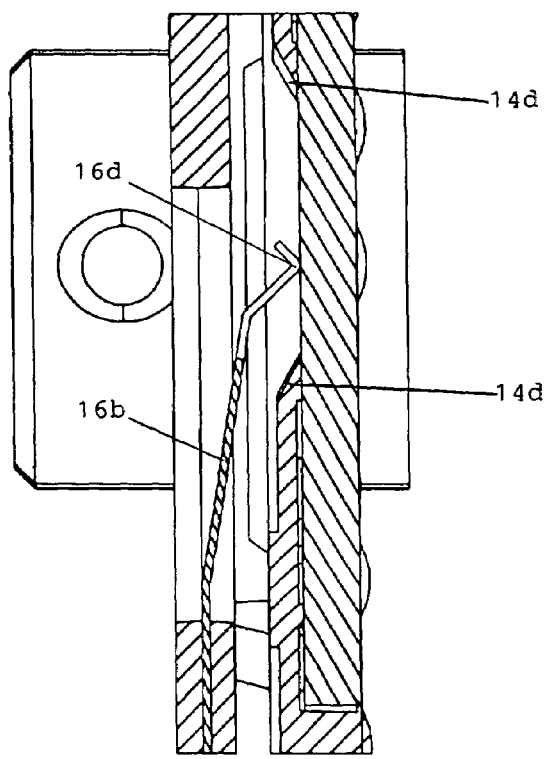
FIG. 7 is a cross section taken on line E—E of FIG. 1.
Figure 8:
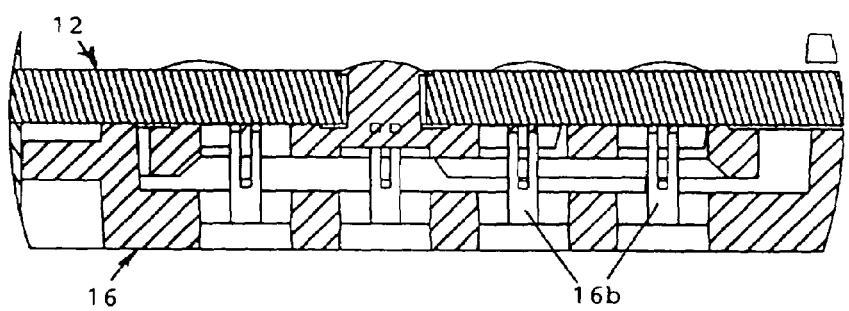
FIG. 8 is a cross sectional view of Detail D of FIG. 3.
Figure 5:
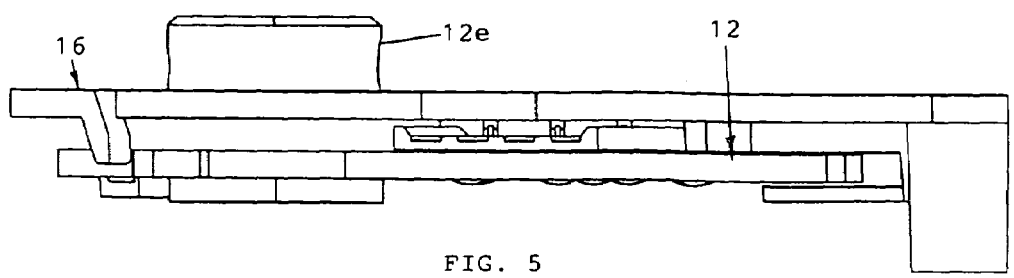
FIG. 5 is a front elevation relative to the FIG. 2 structure as shown.
Figure 9:
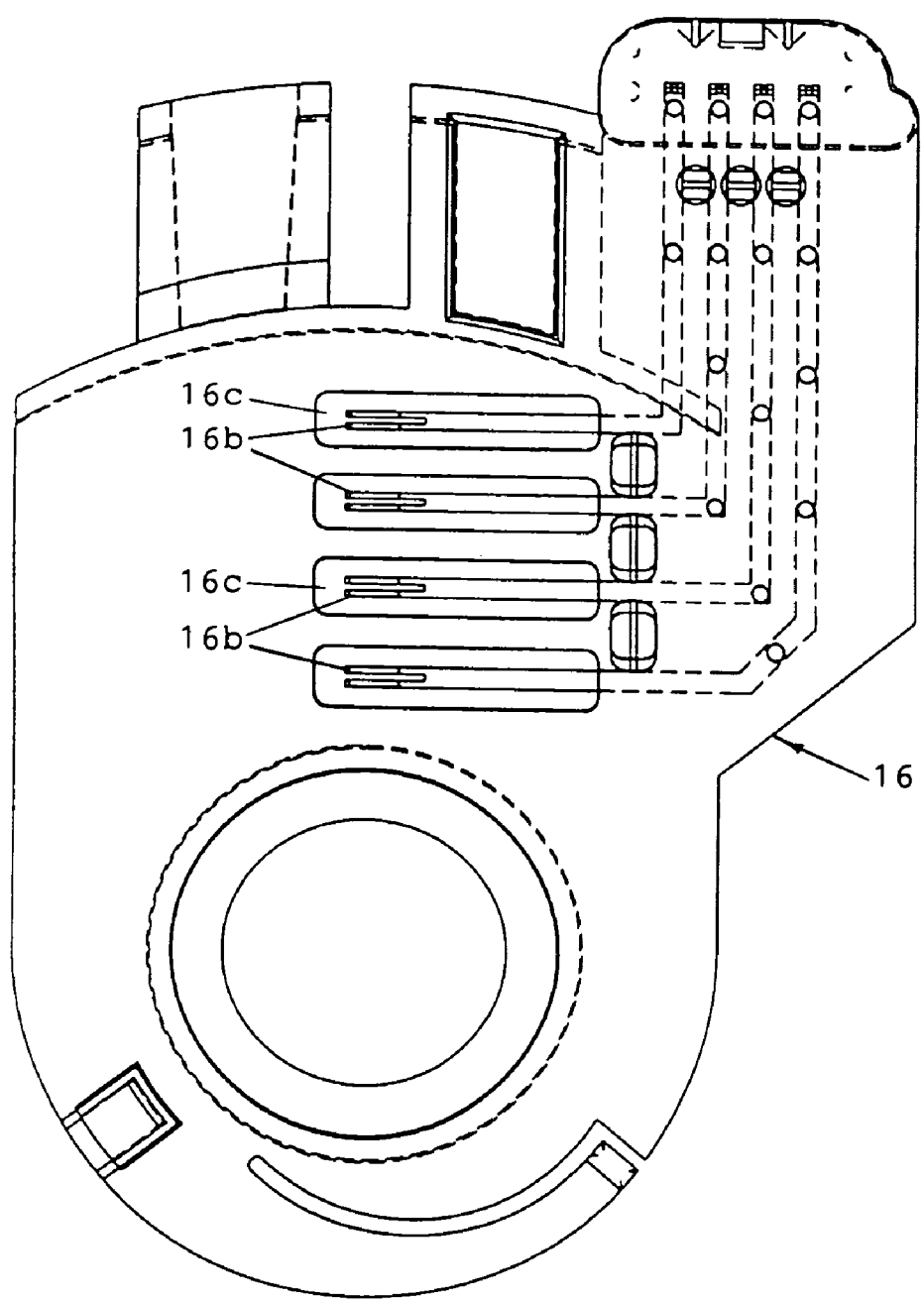
FIG. 9 is an enlarged top plan view of the actuator, as show in FIG. 2.

With particular reference to FIG. 1, the position sensor or electrical switch system 10 responsive to gear selection of a vehicle transmission made according to a preferred embodiment of the invention comprises an electrically conductive detent plate 12 having an outer periphery formed with a plurality of detents 12a corresponding to gear selections which accommodate a roller (not shown) within a respective detent as the detent plate rotates about a longitudinal axis 2 in a known manner. An electrically insulating ramp plate 14 is fixedly mounted to a face surface of the detent plate and is formed with a plurality of arcuate slots 14a on arcuate tracks 14b preferably separated from one another by arcuate extending ribs 14c. Each slot is formed with an inclined ramp 14d at opposed ends of the slot (see FIG. 7) and with a raised area 14e surrounding each of slots 14a to help ensure contact with the detent plate.

A generally plate type actuator 16 is formed of electrically insulating, moldable material and has an electrically conductive lead frame preferably insert molded in the actuator with a plurality of circuit paths or tracks extending from connector pins 16g extending out of the actuator plate into a connector shroud 16a to respective cantilever arms 16b extending into cut-out portions 16c of the actuator plate. Each cantilever arm has a free electrical contact end portion 16d biased upwardly above the upper face surface of the actuator plate as seen in FIG. 1.

Detent plate 12 and actuator 16 preferably are provided with interfitting hubs 12e, 16e. Hub 12e of the detent plate is received through a matching bore in hub 16e of the actuator plate for rotational movement relative to the actuator and a shaft receiving bore 12f is formed through hub 12e for fixedly mounting detent plate 12 to the shaft (not shown) for rotational movement therewith.

According to a modified preferred embodiment, contact resistance is decreased by incorporating a supplemental conductive plate 12h, seen in dashed lines in FIG. 1, having improved conductivity characteristics between the detent plate and the lifting ramps attached by suitable means, such as rivets, not shown.

Figure 10:
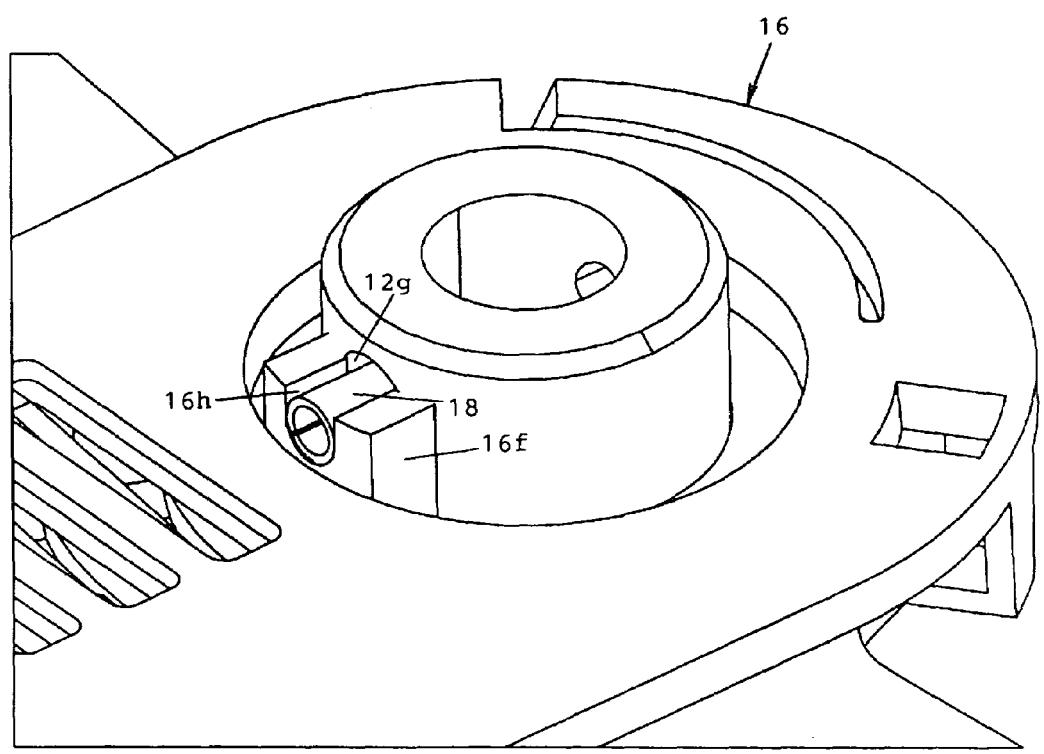
FIG. 10 is a perspective of a portion of the reverse side of FIG. 1, as assembled.

According to an additional preferred embodiment of the invention, a locking feature is shown in FIG. 10. A pin receiving slot 16h is formed in block 16f of actuator 16 adjacent to the bore in hub 16e which serves as a reference surface so that when hub 12e of the detent plate is received through the bore, a pin 18 can be partially inserted into a radial bore 12g in hub 12e while disposed in the slot in block 16 to thereby prevent rotational movement between the two parts and maintain the position sensor in a selected orientation for shipment to the OEM. During assembly, the shaft (not shown) is inserted through bore 12f of hub 12e and the pin is driven through the radial bore in hub 12e and in a like bore in the shaft. This feature can obviate the use of a shipping cap which is sometimes used and whose function is to lock the position sensor in the selected orientation and/or help to keep contamination out of the connector area. Once the pin is driven into the shaft the actuator is free to rotate relative to the detent plate.

This design includes a number of advantageous features:

The ability for the contacts and connector pins to be formed from a single piece of material, as in the lead frame described, eliminating the need for mechanical and electrical connections. This also allows for a lower part count. While this is ideal, it is not essential to the design, and contacts and connector pins may be connected by other means (such as rivets). Using the ramps as the only component that will control the location of making or breaking electrical contact in a non-planar fashion as the actuator rotates, this makes tuning and/or changing switch points cheaper, easier and faster. Because the contacts are part of the actuator, if the contacts are aligned with the manual shaft axis 2 and the detent roller (REF), the ramps may be oriented such that the openings that allow electrical engagement between the contacts and the detent plate align with the detent area on the detent plate for that particular gear. This simplifies orientation and layout, enabling a more accurate part. This design will be more robust with respect to conductive contamination. Shorting across the windowed areas of the ramp plate is not a concern since the common ground concept is used. In other designs that use an external ground source, a short between adjacent windowed areas could give a false electrical output from the device. Relative to shorting across the windowed areas of the ramp plate, shorting across the contacts is less likely to occur due to ribs in the ramp plate between each of the several contacts, their orientation and spacing.

It will be apparent to those skilled in the art that variations of the structure described can be made to accomplish the same purpose. All such variations within the scope of the claims are intended to be within the scope and spirit of the present invention.

What is claimed:

1. Vehicular transmission sensor apparatus for providing an electrical output corresponding to gear selection comprising:

an electrically conductive detent plate having opposed upper and lower generally parallel extending face surfaces and a hub formed with a shaft receiving bore having a longitudinal axis extending generally perpendicular to the face surfaces, the hub having an extension extending a selected distance beyond the lower face surface, the detent plate having an outer periphery formed with a plurality of detents corresponding to the gear selections, an electrically insulating ramp plate having upper and lower surfaces and formed with arcuately extending spaced apart slots extending through the ramp plate between the upper and lower surfaces thereof, the slots formed along a plurality of radially spaced apart tracks, the ramp plate fixedly mounted on a face surface of the detent plate, an actuator comprising an electrically conductive lead frame insert molded in electrically insulating material, the actuator having a hub formed with a bore having a longitudinal axis, a connector portion and a plurality of cut-out portions formed in a surface of the actuator, the lead frames having a plurality of tracks extending from the connector portion with respective tracks extending into the cut-out portions to form cantilever arms each having a free contact end disposed in a respective one of the cut-out portions, the extension of the hub of the detent plate received through the bore in the hub of the actuator with a respective one of the cantilever arms aligned with a track of the ramp plate and with the contact ends biased toward the detent plate so that rotational movement of the detent plate relative to the actuator about the longitudinal axis will bring respective contact ends into and out of electrical engagement with the detent plate in dependence upon an angular position of the detent plate relative to the actuator.

2. Vehicular transmission sensor apparatus according to claim 1 further comprising a layer of material fixed to the detent plate between the detent plate and the ramp plate, the layer having higher electrical conductivity than that of the detent plate.

3. Vehicular transmission sensor apparatus according to claim 1 including a pin receiving bore formed in the detent plate hub extending into the shaft receiving bore and extending in a radial direction relative to the longitudinal axis and pin stop surfaces formed on the actuator aligned with and positioned adjacent to the bore in the detent level hub when assembled to the actuator, the pin stop surfaces aligned with a reference surface and used for locking the actuator to the detent level in a selected orientation for purposes of shipment and handling.

4. Vehicular transmission sensor apparatus according to claim 1 in which the ramp plate is formed with a raised surface surrounding each spaced apart slot on the side of the ramp plate attached to the detent plate to help ensure contact with the detent plate.

5. Vehicular transmission sensor apparatus for providing an electrical output corresponding to gear selection comprising:

an electrically conductive detent plate having opposed upper and lower generally parallel extending face surfaces and a hub formed with a shaft receiving bore having a longitudinal axis extending generally perpendicular to the face surfaces, the hub having an extension extending a selected distance beyond the lower face surface, the detent plate having an outer periphery formed with a plurality of detents corresponding to the gear selections, an electrically insulating ramp plate having upper and lower surfaces and formed with spaced apart slots extending through the ramp plate between the upper and lower surfaces thereof, the slots formed along a plurality of radially spaced apart tracks, the ramp plate fixedly mounted on a face surface of the detent plate, an actuator formed of electrically insulating material mounting electrically conductive leads, the actuator having a hub formed with a bore having a longitudinal axis, a connector portion and a plurality of cut-out portions formed in a surface of the actuator, a switch element connected to respective conductive leads disposed in each cut-out portion, said extension of the hub of the detent plate received through the bore in the hub of the actuator with a respective switch element aligned with a track of the ramp plate biased toward the detent plate so that rotational movement of the detent plate relative to the actuator about the longitudinal axis will bring respective switch elements into and out of electrical engagement with the detent plate in dependence upon the angular position of the detent plate relative to the actuator.

6. Vehicular transmission sensor apparatus according to claim 5 further comprising a layer of material fixed to the detent plate between the detent plate and the ramp plate, the layer having higher electrical conductivity than that of the detent plate.

7. Vehicular transmission sensor apparatus according to claim 5 including a pin receiving bore formed in the detent plate hub extending into the shaft receiving bore and extending in a radial direction relative to the longitudinal axis and pin stop surfaces formed on the actuator aligned with and positioned adjacent to the bore in the detent level hub when assembled to the actuator, the pin stop surfaces aligned with a reference surface and used for locking the actuator to the detent level in a selected orientation for purposes of shipment and handling.

8. Vehicular transmission sensor apparatus according to claim 5 in which the ramp plate is formed with a raised surface surrounding each spaced apart slot on the side of the ramp plate attached to the detent plate to help ensure contact with the detent plate.

* * * * *